Jan. 5, 1932.  H. S. SMITH  1,839,709
METHOD OF AND APPARATUS FOR CEMENTING WELLS
Filed Sept. 25, 1930  2 Sheets-Sheet 2

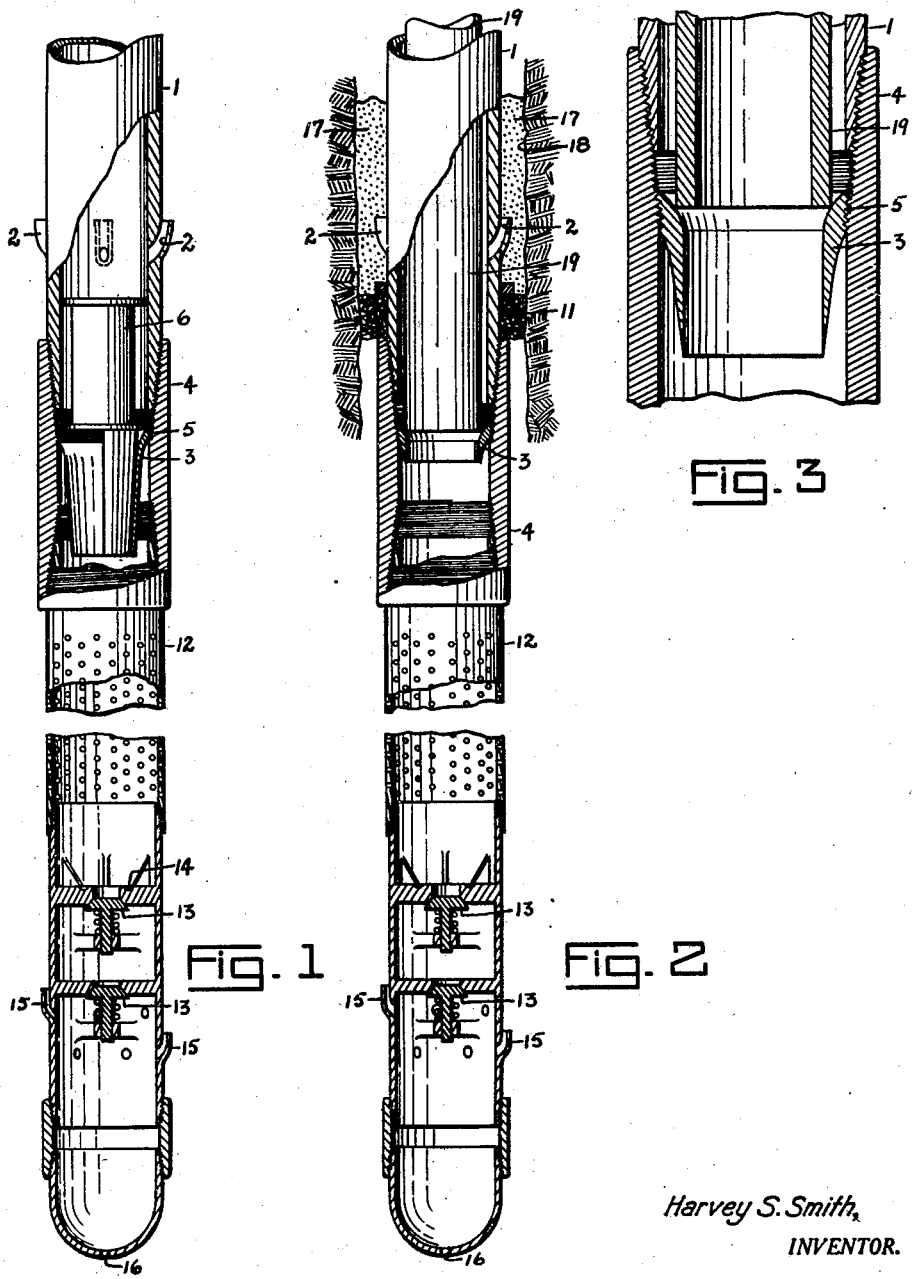

Harvey S. Smith,
INVENTOR.

BY
J. Vincent Martin
ATTORNEY.

Patented Jan. 5, 1932

1,839,709

UNITED STATES PATENT OFFICE

HARVEY S. SMITH, OF HOUSTON, TEXAS

METHOD OF AND APPARATUS FOR CEMENTING WELLS

Application filed September 25, 1930. Serial No. 484,297.

This invention relates to methods of and apparatus for cementing wells.

A conventional procedure after the drilling of a well includes lowering a casing into the bore, forcing cement through the lower end of the casing, permitting the cement to harden about the lower end of the casing, drilling through the cement, and then lowering a tube, which has a screen attached to the end thereof, through the casing and the hole in the cement. The oil or other fluid flows through the screen and upwardly in the tubing to the surface of the earth. The space between the casing and the tubing is sealed by suitable packing means.

This invention has for its general object the provision of a new and improved method of and apparatus for cementing wells.

In accordance with the present invention, the cement is forced through a casing and made to fill the space between a portion of the casing remote from its lower end, and the wall of the bore, after which communication between the interior of the casing and the space in the bore below the cement may readily be effected to permit the passage of fluid upwardly through the casing.

More specifically, the present invention provides a casing having a cement exit opening therein and a screen attached thereto below the opening, and removable sealing means between the opening and the screen, so that cement may be forced downwardly into the casing and through the opening therein into the space between the casing and the wall of the bore above the screen; and, after the cement has hardened, the sealing means may be removed to permit the flow of oil or other fluid through the screen and upwardly in the casing.

Figure 4:
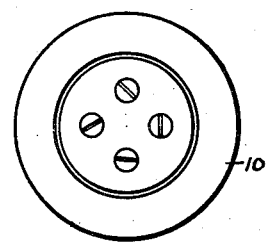
Figure 5:
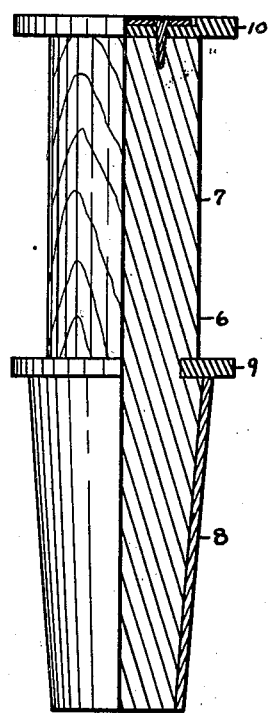

The preferred embodiment of the apparatus is illustrated by the accompanying drawings, of which Fig. 1 is a partly sectional elevation of the apparatus with the sealing plug in place; Fig. 2, a similar view with the cement in place, the plug having been drilled out; Fig. 3, a detail sectional view illustrating the drilled plug seat and the flow tubing; Figs. 4 and 5, detail top and partly sectional side views of the plug, respectively; and Figs. 6 and 7, top and side views of the plug seat, respectively.

The casing comprises a pipe 1 having spaced and upwardly directed cement exit openings 2.

Figure 6:
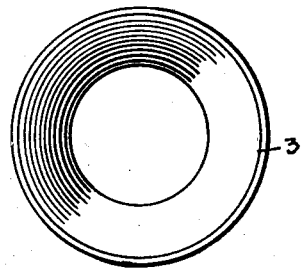
Figure 7:
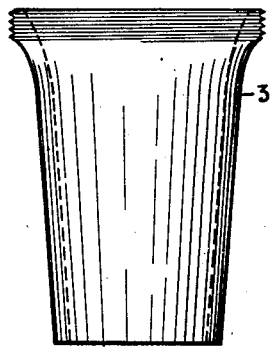

Below said openings is the plug seat 3, which is internally tapered (Figs. 6 and 7). It is screwed into the coupling 4 as indicated at 5 (Fig. 3). The plug 6 is frangible and has a cylindrical portion 7, a tapered portion 8, and guide rings 9 and 10 at the extremities of its cylindrical portion (Figs. 4 and 5). Suitable outside packing means 11 (Fig. 2) may be provided to prevent dropping of the cement into the space about the screen 12.

The screen 12 is below the seat 3 and packing means 11, and below the screen are the back pressure valves 13. The seat for the upper of these valves has an annular groove 14 for the reception of a wash tube. Below the back pressure valves are the upwardly directed openings 15; and in the bottom of the apparatus is the opening 16.

The method of cementing the well is as follows:

The casing having been lowered into the bore, fluid may be pumped (by any conventional pump not shown) through the casing, the cement exit openings 2 and the screen openings, to wash out the cement exit openings 2 and the screen, and the bore about the same. If the screen is unusually long, a wash tube (not shown) smaller than the flow tube 19, may be lowered in the casing until its end rests in groove 14 of the back pressure valve seat. Fluid may then be forced by the pump through the wash tube, and it will emerge through the openings 15 and 16.

The plug 6 is then placed in the casing and pumped down until it reaches the seat 3, when the resistance offered the pump will be much greater. The operator can therefore tell when the plug 6 has reached its destination by observing the pump. Cement is then pumped into the casing and through the openings 2 into the space between the casing and the wall 18 of the bore, as indicated by Fig. 2. Then a second plug, not shown, may be pumped down the casing to follow the cement.

When this second plug reaches the first plug 6, practically all of the cement will have been expelled from the casing through the openings 2; and as the second plug is substantially the same as the first plug, the passage of fluid through the openings 2 will be obstructed, and the driller will therefore be advised by the resistance offered to the pump when the second plug has reached the first plug.

The cement is then held under pressure and permitted to set, and then any conventional drill (not shown) may be lowered into the casing and made to cut away the first and second plugs and a part of seat 3. Compare Figs. 1 and 2. The drill will also cut through any cement left in the casing 1 so that after the drill is removed, oil or other fluid may move through the screen 12 upwardly in the casing 1 to the surface. The cement will seal the openings 2 so that fluid cannot escape therethrough, but if desired the openings 2 may be positively cut off by the use of a flow tube 19 lowered in the casing to rest upon the remaining portion of the seat 2, as shown by Figs. 2 and 3.

Should it be desired to obtain fluid from a point deeper in the earth, a drill may be lowered in the casing through the seat 3, and made to cut away the back pressure valves 13 and their seats, pass through the lower end of the apparatus, and penetrate the earth to the desired depth. The drill stem may then be removed and a casing smaller but of the same type as that hereinabove described may be lowered through the original casing into the new bore and cemented in a like manner. The second casing may be drilled through, and a third smaller and similar casing employed, and so on, to secure fluid from point after point farther away from the earth's surface.

I claim:

1. Well cementing apparatus comprising a pipe having a normally unobstructed cement exit opening therein, a plug seat below said opening, a screen below said seat, said seat having an opening communicating with said pipe and said screen, and a plug movable downwardly in said pipe into sealing engagement with said seat to close the opening in said seat.

2. Well cementing apparatus comprising a pipe having a normally unobstructed cement exit opening therein, a plug seat below said opening, a screen below said seat, said seat having an opening communicating with said pipe and said screen, a back pressure valve below said screen, and a plug movable downwardly in said pipe into sealing engagement with said seat to close the opening in said seat.

3. Well cementing apparatus comprising a pipe having a normally unobstructed cement exit opening therein, a plug seat below said opening, outside packing means below said opening, a screen below said packing means and said seat, said seat having an opening communicating with said pipe and said screen, and a plug movable downwardly in said pipe into sealing engagement with said seat to close the opening in said seat.

4. Well cementing apparatus comprising a pipe having a normally unobstructed upwardly directed cement exit opening therein, a plug seat below said opening, a screen below said seat, said seat having a downwardly tapered opening communicating with said pipe and said screen, and a plug movable downwardly in said pipe into sealing engagement with said seat to close the opening in said seat.

5. Well cementing apparatus comprising a pipe having a normally unobstructed upwardly directed cement exit opening therein, a plug seat below said opening, outside packing means below said opening, a screen below said packing means and seat, said seat having a downwardly tapered opening communicating with said pipe and said screen, and a plug movable downwardly in said pipe into sealing engagement with said seat to close the opening in said seat.

In testimony whereof, I hereunto affix my signature.

HARVEY S. SMITH.